United States Patent
Endo et al.

(10) Patent No.: US 9,743,247 B2
(45) Date of Patent: Aug. 22, 2017

(54) POSITION INFORMATION PROVIDING DEVICE, POSITION INFORMATION PROVIDING SYSTEM

(75) Inventors: Masato Endo, Nagoya (JP); Chihaya Todoroki, Nissin (JP); Hiroaki Sekiyama, Tokyo (JP); Takayuki Sumiya, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 335 days.

(21) Appl. No.: 14/400,006

(22) PCT Filed: May 11, 2012

(86) PCT No.: PCT/JP2012/062171
§ 371 (c)(1),
(2), (4) Date: Jan. 5, 2015

(87) PCT Pub. No.: WO2013/168286
PCT Pub. Date: Nov. 14, 2013

(65) Prior Publication Data
US 2015/0126225 A1    May 7, 2015

(51) Int. Cl.
*H04W 4/02*    (2009.01)
*G01C 21/36*    (2006.01)
(Continued)

(52) U.S. Cl.
CPC ........ *H04W 4/025* (2013.01); *G01C 21/3679* (2013.01); *G01C 21/3682* (2013.01);
(Continued)

(58) Field of Classification Search
None
See application file for complete search history.

(56) References Cited

U.S. PATENT DOCUMENTS

| 2011/0112717 A1 | 5/2011 | Resner |
| 2011/0224864 A1 | 9/2011 | Gellatly et al. |

(Continued)

FOREIGN PATENT DOCUMENTS

| CN | 101038178 A | 9/2007 |
| JP | 2002-243467 A | 8/2002 |

(Continued)

OTHER PUBLICATIONS

European Office Action issued Oct. 8, 2015 in Patent Application No. 12 876 579.9.

(Continued)

*Primary Examiner* — Diane Mizrahi
(74) *Attorney, Agent, or Firm* — Oblon, McClelland, Maier & Neustadt, L.L.P.

(57) ABSTRACT

A navigation device, which works as a position information providing device for providing information on positions to a user, includes a terminal ECU that can log in management servers, each of which manages a social networking service (SNS) to which information can be posted, via a line network. The terminal ECU logs in the management servers via the line network in synchronization with a start operation of the navigation device to acquire the whole or a part of posting information on positions posted to the SNS by network users and accumulated in the management servers.

5 Claims, 6 Drawing Sheets

(51) Int. Cl.
*G06Q 10/10* (2012.01)
*G06Q 50/00* (2012.01)
*G09B 29/00* (2006.01)
*H04L 29/08* (2006.01)
*H04W 4/20* (2009.01)

(52) U.S. Cl.
CPC ....... *G01C 21/3685* (2013.01); *G06Q 10/101* (2013.01); *G06Q 50/01* (2013.01); *G09B 29/007* (2013.01); *H04L 67/18* (2013.01); *H04W 4/021* (2013.01); *H04W 4/206* (2013.01)

(56) References Cited

U.S. PATENT DOCUMENTS

| | | | |
|---|---|---|---|
| 2011/0291860 A1 | 12/2011 | Ozaki et al. | |
| 2012/0173377 A1* | 7/2012 | Soroca | G06Q 30/08 705/26.3 |
| 2012/0185349 A1* | 7/2012 | Soroca | G06Q 30/08 705/26.3 |
| 2013/0304581 A1* | 11/2013 | Soroca | G06F 17/30035 705/14.64 |

FOREIGN PATENT DOCUMENTS

| | | |
|---|---|---|
| JP | 2007-67535 A | 3/2007 |
| JP | 2008-33755 | 2/2008 |
| JP | 2008-282234 | 11/2008 |
| JP | 2010-54484 | 3/2010 |
| JP | 2010-164688 | 7/2010 |
| JP | 2011-118858 A | 6/2011 |
| JP | 2011-247832 A | 12/2011 |
| JP | 2012-8969 | 1/2012 |

OTHER PUBLICATIONS

"Google Local Business Center Help", InsideOut Solutions, XP 55217979 A, Nov. 12, 2009, pp. 1-6.

Extended Search Report issued Feb. 5, 2015 in European Patent Application No. 12876579.9.

Insideout Solutions, Inc, "How to get top Placement on Google Maps", XP55165108, Nov. 12, 2009, 10 pages.

International Search Report issued Jul. 31, 2012, in PCT/JP2012/062171, filed May 11, 2012.

* cited by examiner

POSITION INFORMATION PROVIDING DEVICE, POSITION INFORMATION PROVIDING SYSTEM

TECHNICAL FIELD

The present invention relates to a technology for providing information on positions to the user.

BACKGROUND ART

Patent Literature 1 to Patent Literature 3 disclose various information providing systems that allow the user to log in a network service such as Social Networking Service (SNS) via a car navigation device, provided for performing route guidance of a vehicle, and provide information from this network service to the vehicle occupants.

For example, the system disclosed in Patent Literature 3 given below allows the user to log in an SNS server of a network service from a car navigation device to acquire information from the SNS server and from a gourmet site server connected to the SNS server and displays the acquired acquisition information on the display unit of the car navigation device. More specifically, this acquisition information includes the following two types of information: guide information and store information. The guide information is information on the surrounding of the current position, for example, "Route ○", and the store information is community information corresponding to the guide information, for example "Chinese Noodle A".

CITATION LIST

Patent Literatures

Patent Literature 1: Japanese Patent Application Publication No. 2012-008969 (JP 2012-008969 A)
Patent Literature 2: Japanese Patent Application Publication No. 2010-164688 (JP 2010-164688 A)
Patent Literature 3: Japanese Patent Application Publication No. 2010-054484 (JP 2010-054484 A)

SUMMARY OF THE INVENTION

In the information providing system described above, the user who logs in an SNS server must perform a special operation to insert a storage medium, on which authentication data is stored, into the slot on the car navigation device, meaning that the operation for acquiring information from the SNS server is cumbersome. In addition, the information such as the guide information and the community information described above is stored in the information table that is not updated, meaning that it is difficult to reflect ever-changing frank impressions or opinions of the users who later visit the store. Therefore, in building a system, such as the car navigation device described above, that provides position information to the user, there is a strong need for providing network-user-created useful information by reflecting, in real time, the opinions of network users who use the network service.

In view of the foregoing, it is one of the objects of the present invention to provide an efficient technology for simply providing useful information provided by network users.

To achieve the above object, the position information providing device according to the present invention is configured as a device for providing position information to the users. The "position information providing device" mentioned here includes a navigation device that executes the function (navigation function) for performing the route guidance of a vehicle and a device that provides the map information service on the Internet. The navigation device may be one of the following two types of terminal apparatus. One type is a terminal apparatus, mounted in a particular vehicle as a special-purpose apparatus or mounted as an apparatus shared among a particular vehicle and other vehicles, for executing the navigation function. The other type is a terminal apparatus, in which a GPS receiver is mounted, for executing the navigation function by navigation application software (also called a "navigation-application") or by a communication contract.

This position information providing device includes a control unit and a display device. The control unit can log in a management server, which manages a network service to which information can be posted, via a line network. This control unit logs in the management server via the line network in synchronization with a predetermined operation, which executes a function other than a function to cooperate with the network service, to acquire a whole or a part of posting information on positions that is posted to the network service by a network user and accumulated in the management server. That is, this control unit executes the following two functions: one is the function that operates as login means for logging in the management server of a network service and the other is information acquisition means for acquiring posting information accumulated in the management server. It is preferable that the acquired information be output in an appropriate form, such as display output or voice output, so that the posting information on positions is supplied to the users who need it. In this case, the whole or a part of the users, who need the posting information on positions, and network users may or may not be the same. When the position information providing device is a navigation device, the control unit may be control means that works also as the control means for controlling the proper navigation function of the navigation device or may be dedicated control means provided separately from the control means described above.

In this case, "the operation that executes a function to cooperate with the network service" typically includes the cooperation operation in which, in order to use a predetermined network service, the user positively contacts the network service to search for, and acquire, posting information on the network service. In contrast, the "predetermined operation" mentioned here is defined as an operation to execute a function other than the cooperation with the network service described above, that is, an operation that is performed by the user without considering the network service or the posting information on the network service. More specifically, the predetermined operation includes the operation performed by the user to start the position information providing device (the operation to enable the navigation function when the position information providing device is a navigation device), the operation on a device other than the position information providing device, and the operation on the whole vehicle such as the operation on the steering switches provided on the steering wheel of the vehicle in which the user of the position information providing device rides and the operation to set the parking brake of the vehicle from the on state to the off state.

The "posting information on positions" mentioned here typically includes position information on places, stores, or facilities selected by network users as a destination or a destination candidate, position information on places, stores, or facilities affirmatively or negatively evaluated by network users, and position information on places, stores, or facilities network users passed or reached (the so-called check-in information).

When logging in a management server, it is preferable that account authentication be performed automatically using both the account of the position information providing device and the account of the management server. The account in this case is defined typically by the login ID or by the combination of the login ID and the password. The information acquired from the posting information accumulated in the management server may be only the updated information that is newly updated or the information created by adding the past information to the updated information.

According to the position information providing device described above, the user can easily acquire posting information on positions included in various types of posting information posted to a network service, which is especially useful to the user and is posted by network users, without having to worry about the cooperation with the network service (without the user having to perform a special operation).

It is preferable that the position information providing device according to the present invention include a measuring unit that can measure a current position of the user, wherein, when logging in the management server, the control unit selectively acquires surrounding evaluation information from the posting information accumulated in the management server, the surrounding evaluation information being evaluated by the network user for a surrounding position within a predetermined distance from the current position of the user measured by the measuring unit. That is, this control unit executes the function as information acquisition means for selectively acquiring surrounding evaluation information from posting information accumulated in the management server. This makes it possible for the user of the position information providing device to easily acquire surrounding evaluation information, which is useful to the user and is posted by network users, without worrying about the network service.

In the position information providing device according to the present invention, it is preferable that, when logging in the management server, if the posting information includes evaluation information evaluated by another person having a particular relation with the user on the network, the control unit selectively acquire the evaluation information, as well as information on the another person, from the posting information accumulated in the management server. That is, this control unit executes the function as information acquisition means for selectively acquiring evaluation information posted by the another person, as well as information on the another person, from the posting information accumulated in the management server. The "another person having a particular relation with the user" mentioned here includes a person who is a friend of the user on the network (regardless of whether the user has actually met him or her) and a celebrity (famous person) or an entertainer who is unilaterally identified by the user through a particular mass media (medium such as TV, radio, magazine). This makes it possible for the user of the position information providing device to easily acquire the evaluation information, which is useful to the user and is posted by another person having a particular relation with the user, as well as the information on the another person, without worrying about the network service.

In the position information providing device according to the present invention, it is preferable that, when logging in the management server, if the posting information includes evaluation information evaluated a plurality number of times by another person having no friend relation with the user on the network, the control unit selectively acquire the evaluation information from the posting information accumulated in the management server. That is, this control unit executes the function as information acquisition means for selectively acquiring evaluation information evaluated a plurality number of times by the another person from the posting information accumulated in the management server. The "another person having no particular relation with the user" mentioned here is defined as persons having no particular relation with the user at all and not including the friend, celebrity (famous person), and entertainer described above. This makes it possible for the user of the position information providing device to easily acquire the evaluation information, which is useful to the user and is posted by another person having no particular relation with the user, without worrying about the network service.

It is preferable that the position information providing device according to the present invention further include a display unit that displays information, acquired by the control unit, with map information. This makes it possible for the user of the position information providing device to easily and visually recognize the information, acquired by the control unit, using the display unit.

In the position information providing device according to the present invention, it is preferable that the predetermined operation be an operation for starting the position information providing device. This makes it possible for the user of the position information providing device to easily acquire the posting information, posted by network users, when the position information providing device is started.

In the position information providing device according to the present invention, it is preferable that the control unit log in the management server via the line network in synchronization with an operation to search for a destination, which is the predetermined operation, and selectively acquire destination candidate evaluation information from the posting information accumulated in the management server, the destination candidate evaluation information being evaluated by the network user for destination candidates extracted by the search. That is, this control unit executes the function as information acquisition means for selectively acquiring the destination candidate evaluation information from the posting information accumulated in the management server. This makes it possible for the user of the position information providing device to easily acquire the destination candidate evaluation information, posted by network users, when a search for a destination is performed.

It is preferable that the position information providing device according to the present invention further include a display unit that displays the destination candidate evaluation information, acquired by the control unit, as well as the destination candidates corresponding to the information. This makes it possible for the user of the position information providing device to easily and visually recognize the destination candidate evaluation information, displayed with the destination candidates, using the display unit.

In the position information providing device according to the present invention, it is preferable that the display unit display a destination candidate, corresponding to the destination candidate evaluation information that is friend evaluation information evaluated by a friend of the user on the network, in a display mode with a priority higher than a priority of a destination candidate corresponding to the destination candidate evaluation information that is not the friend evaluation information. That is, the display mode that differs according to the priority of a destination candidate is used so that the priority of a destination, corresponding to the information evaluated by a friend, is increased. This makes it possible for the user of the position information providing device to select a destination from the destination candidates on which the evaluation information, posted by friends, is reflected. In addition, the user of the position information providing device can easily identify a destination candidate corresponding to the information evaluated by a friend.

A position information providing device according to the present invention is a device for providing information on positions to a user and includes a control unit and a display unit. This control unit can log in a management server, which manages a network service, via a line network to post a destination of the user to the network service. That is, this control unit executes the following two functions: one is the function as login means for logging in the management server of a network service and the other is the function as posting means for posting a destination of the user to a network service. The display unit displays a screen in synchronization with a predetermined operation, the screen prompting the control unit to post the destination (the so-called check-in) to the network service, the predetermined operation executing a function other than a function to cooperate with the network service. This makes it possible for the user of the position information providing device to perform an operation to post a destination as necessary without having to perform a special operation.

A position information providing device according to the present invention is a device for providing information on positions to a user and includes a control unit and a display unit. The control unit can log in a management server, which manages a network service, via a line network to post a destination of the user to the network service. This control unit directly or indirectly sends a notification to a terminal apparatus managed by the user in synchronization with a predetermined operation, the notification prompting to post the destination to the network service, the predetermined operation executing a function other than a function to cooperate with the network service. That is, this control unit executes the following two functions: one is the function as login means for logging in the management server of a network service and the other is the function as notification means for sending a notification, which prompts to post a destination, to a terminal apparatus. In this case, the user of the position information providing device is typically a contractor or a user of the position information providing device. The terminal apparatus is typically a mobile phone or a personal computer (PC). This makes it possible for the user of the position information providing device to receive a notification, which confirms whether to post a destination, without having to perform a special operation.

In the position information providing device according to the present invention, it is preferable that the predetermined operation be an operation for enabling parking braking of a vehicle in which the user rides. This makes it possible for the user of the position information providing device to easily acquire a notification, which confirms whether to post a destination, when the vehicle is stopped.

A position information providing device according to the present invention is a device for providing information on positions to a user and includes a control unit and a display unit. The control unit can log in a management server, which manages a network service, via a line network to post a destination of the user to the network service. That is, this control unit executes the following two functions: one is the function as login means for logging in the management server of a network service and the other is the function as posting means for posting a destination of the user to the network service. The display unit displays an evaluation screen in synchronization with an operation, the evaluation screen being provided for evaluating the destination, the operation being performed to set a starting device of a vehicle, in which the user rides, from an off state to an on state and, at the same time, to set a parking brake of the vehicle from a disabled state to an enabled state. In this case, the "starting device of a vehicle" is typically the ignition device of a vehicle that travels only on an internal combustion engine or an electric vehicle or a mobile phone for starting the ignition device. This makes it possible to prompt the evaluation of a destination without the user of position information providing having to perform a special operation.

In the position information providing device according to the present invention, it is preferable that, if evaluation is not performed for the destination, the control unit send a notification to a terminal apparatus managed by the user, the notification prompting to evaluate the destination. This makes it possible to prompt to evaluate the destination more strongly without the user of position information providing device having to perform a special operation.

A position information providing system according to the present invention includes the position information providing device, the management server that manages one or more social networking services (SNS) each working as the network service, and the line network that connects the position information providing device and the management server. This makes it possible to build an efficient information providing system that allows the user to easily acquire the posting information on positions, which is useful to the position information providing device user and is posted by network users, without having to worry about the network service.

MODES FOR CARRYING OUT THE INVENTION

Figure 1:
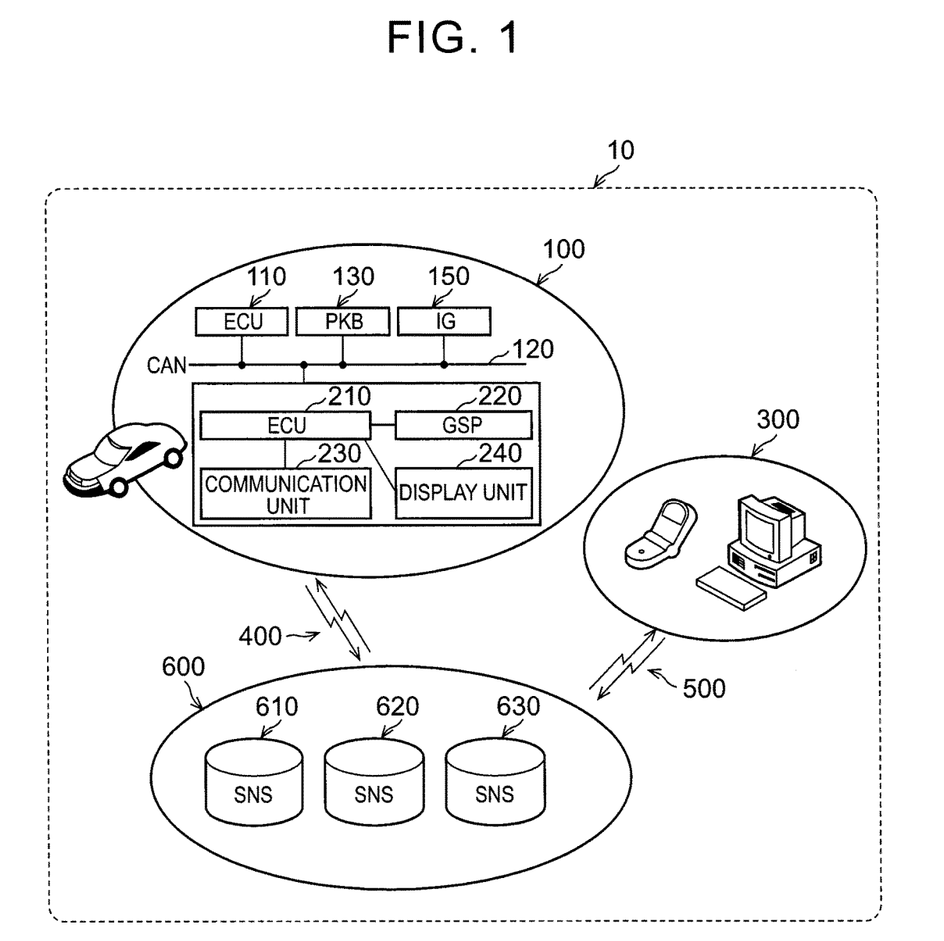
FIG. 1 is a schematic diagram of a position information providing system 10 in the present invention.

A position information providing device and a position information providing system in one embodiment of the present invention are described below with reference to the attached drawings. FIG. 1 is a schematic diagram of a position information providing system 10 in the present invention.

The position information providing system 10 shown in FIG. 1 includes the following components: a plurality of vehicles 100, a plurality of information terminals 300, line networks 400 and 500, and an information providing center 600. FIG. 1 shows only one vehicle 100 and only one information terminal 300, respectively, for convenience sake. Other components may also be added as necessary to the components described above. This position information providing system 10 corresponds to a "position information providing system" in the present invention.

The vehicle 100 has one or more electronic control units 110 (hereinafter also called "vehicle ECU 110") that controls the state of the vehicle. Each vehicle ECU 110 is connected to a CAN communication line 120 of the CAN (Controller Area Network) communication system to send and receive various signals via this CAN communication line 120. Each vehicle ECU 110, with a microcomputer composed of a CPU, a ROM, and a RAM as its main component, has a memory, an input/output interface, and a driving circuit that receives sensor signals for driving various actuators. In this vehicle 100, the vehicle ECU 110 is connected to a parking brake (also called a "PKB") 130, an ignition (also called an "IG") device 150, and a navigation device 200, respectively. For example, the ON/OFF information on each of the parking brake 130 and the ignition device 150 is output to the navigation device 200 via the CAN communication line 120.

As the vehicle 100 described above, an electric vehicle (EV), which uses the electric power of batteries to drive the drive motor, and a plug-in hybrid vehicle (PHV), which has a drive motor and an internal combustion engine and has its batteries charged by a charger, may be used. In addition to these vehicles, a conventional vehicle, which does not have a drive motor and travels only by an internal combustion engine, may also be used, meaning that any drive type of vehicle may be used.

The navigation device 200, mounted in each vehicle 100 (hereinafter also called a "user vehicle"), has at least the navigation mechanism for this vehicle (in general, the function to perform route guidance of the vehicle 100 and the function to provide position information to the user (contractor or user) of the vehicle 100 or the navigation device 200). This navigation device 200 may be one of the following two types of terminal apparatus. One type is a terminal apparatus, mounted in each vehicle 100 as a special-purpose apparatus or mounted as an apparatus shared among this vehicle and other vehicles, for executing the navigation function. The other type is a terminal apparatus such as a mobile apparatus (typically a mobile phone), in which a GPS receiver is mounted or in which a GPS receiver is mounted, for executing the navigation function by navigation application software (also called a "navigation-application") or by a communication contract. In this case, with the navigation device 200 connected to the CAN communication line 120 via cable or wirelessly (for example, short-range wireless communication using Bluetooth (registered trademark)), the CAN information can be communicated to the navigation device 200. In another mode, the CAN information can be sent from the location, where the information from each ECU of the vehicle 100 is collected (for example, CAN-BT (Controller Area Network-Bluetooth)), to the navigation device 200 via communication means. The navigation device 200 is connected temporarily or continuously to the information providing center 600 via the predetermined line network (for example, secure line network such as the Internet line network or a dedicated line network) 400 for information communication to and from the information providing center 600. The line network 400 mentioned here corresponds to the "line network" of the present invention.

The navigation device 200 includes an electronic control unit 210 (hereinafter also called a "terminal ECU 210"), a GPS unit 220, a communication unit 230, and a display unit 240. The terminal ECU 210, with a microcomputer composed of a CPU, a ROM, and a RAM as its main component, has a memory, an input/output interface, and a driving circuit that receives sensor signals for driving various actuators. This terminal ECU 210 has a database in which the information on the users (contractors and users) of the navigation device 200 (for example, contractor name, ID information identifying the user, and account information used by the user to participate in the network service) is stored. The GPS unit 220 executes the function to measure the current position coordinates of the navigation device 200 (or the vehicle 100 when the navigation device 200 is mounted) based on the radio waves received from a GPS satellite. This GPS unit 220, configured to measure the current position of the vehicle 100, configures a "measuring unit" of the present invention. The communication unit 230 executes the function to receive the information sent from the information providing center 600 via the line network 400 or to send the information, received from the terminal ECU 210, to the information providing center 600 via the line network 400. The display unit 240 executes the function to display the output information, received from the terminal ECU 210, on the display screen. The navigation device 200 mentioned here corresponds to the "position information providing device" of the present invention.

The information terminal 300 is connected temporarily or continuously to the information providing center 600 via the predetermined line network (for example, secure line network such as the Internet line network or dedicated line network) 500 for information communication to and from the information providing center 600. Typically, a mobile phone or a personal computer (PC) may be used as the information terminal 300.

The information providing center 600 executes the function to build one or more social networking services (hereinafter also called an "SNS" or a "network service to which messages can be posted"), each of which acts as a social network service, on the Internet. This information providing center 600 has a management server (SNS server) allocated to each SNS. In the example shown in FIG. 1, the information providing center 600 has a management server 610 for the first SNS, a management server 620 for the second SNS, and a management server 630 for the third SNS. The management servers 610, 620, and 630 mentioned here correspond to the "management servers" of the present invention.

Each management server has a database in which the information on the users (contractors and users) of the information terminals 300 is stored (for example, contractor name, phone number of the information terminal 300, mail address, ID information identifying the user, and account information used by the user to participate in the network service). The information providing center 600 accumulates the posting information, posted from each information terminal 300 to the SNS, in the management servers 610, 620, and 630 and, after that, provides the accumulated posting information to the users of the information terminal 300 (so-called followers) and, at the same time, to the navigation device 200.

The position information providing processing performed by the navigation device 200 with the configuration described above is described below with reference to the drawings. This position information providing processing is performed primarily by the terminal ECU 210 that executes the navigation function proper to the navigation device 200. The "control unit" of the present invention is configured by this terminal ECU 210.

The position information providing processing in the first embodiment is described below with reference to FIG. 2 to FIG. 4.

Figure 2:
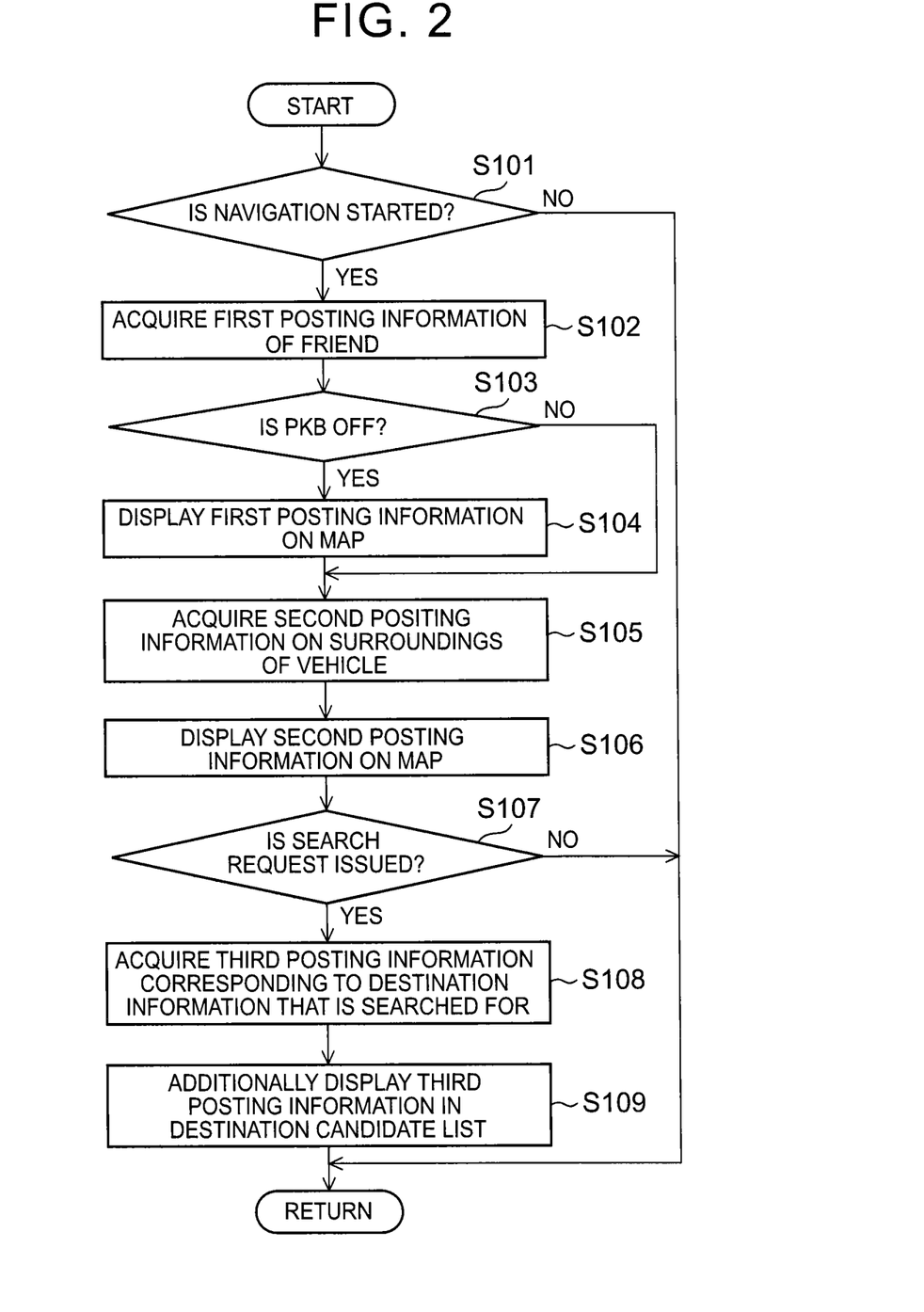
FIG. 2 is a diagram showing a flowchart of position information providing processing in a first embodiment.

According to the flowchart shown in FIG. 2, the terminal ECU 210 first determines in step S101 whether the navigation device 200 is started. In this case, on the navigation device 200, the driver or a fellow passenger (hereinafter also called a "user" of the navigation device 200) performs a predetermined start operation typically by pressing the start button of the navigation function or by touching (also called "tapping") the navigation screen. This operation displays the map information on the current position or the destination on the display unit 240. Therefore, in step S101, the terminal ECU 210 can make the determination described above by detecting whether the start operation described above is performed before the vehicle 100 is started or whether the navigation device 200 is actually started by this start operation. If it is determined that the navigation device 200 is started (Yes in step S101), the processing proceeds to step S102; otherwise (No in step S101), the position information providing processing in terminated without performing any processing.

In step S102, when the navigation device 200 is started, the terminal ECU 210 and the management servers 610, 620, and 630 synchronize with each other so that automatic account authentication is performed between the account of the navigation device 200, stored in advance in the database of the terminal ECU 210, and one or more SNS accounts registered in advance in the management servers 610, 620, and 630 of the information providing center 600. More specifically, the terminal ECU 210 reads the authentication data, used for automatic account authentication, from the database of the terminal ECU 210 and sends this authentication data to the management servers 610, 620, and 630 via the communication unit 230. The authentication data in this case is defined typically by the login ID or by the combination of the login ID and the password. After that, on condition that this account authentication is performed successfully, the terminal ECU 210 searches for posting information on positions (also called "first posting information") that is posted to each network service and accumulated in the management servers 610, 620, and 630, and acquires all or a part of the posting information via the communication unit 230. That is, the terminal ECU 210 executes the following two functions. One is the function that operates as "login means" for logging in the management servers 610, 620, and 630 of the network service. The other is the function that operates as "position information acquisition means" for acquiring all posting information on positions, or for selectively acquiring a part of the posting information, accumulated in the management servers 610, 620, and 630.

This means that, without having to perform a special operation to execute the function to cooperate with the network service (a special operation performed by the user to log in the management servers 610, 620, and 630), the user of the navigation device 200 can acquire the first posting information automatically (also called "seamlessly") by performing a predetermined operation for executing a function other than a function to cooperate with the network service, that is, by synchronizing with the start operation of the navigation device 200 (the operation to enable the navigation function). In this case, the start operation of the navigation device 200 becomes a trigger (trigger operation) for performing the processing for logging in the management servers 610, 620, and 630. Note that the "special operation to execute the function to cooperate with the network service" typically includes the cooperation operation in which, in order to use a predetermined network service, the user positively contacts the network service to search for, and acquire, posting information on the network service. In contrast, the "predetermined operation" is an operation intentionally performed by the user of the navigation device 200. This predetermined operation is defined as an operation to execute a function other than that for cooperation with the network service, that is, as an operation used by the user to perform an operation without worrying about the network service or the posting information on the network service. This allows the user of the navigation device 200 to utilize the first posting information without worrying about the network service. This configuration therefore reflects, in real time, the intention of the network users who use the network service. As an example of change, the configuration may be built such that the first posting information is acquired automatically in synchronization with various operations other than the start operation of the navigation device 200 or with the general operation on the vehicle.

In step S102, the first posting information acquired from the management servers 610, 620, and 630 typically includes the updated part of the position information (also called "friend evaluation information") on the places, stores, and facilities affirmatively evaluated by friends (network users who are friends of the user on the network) who are registered in the network service in advance by the user of the navigation device 200. Typically, an affirmative evaluation such as "Like" is applied to this position information. The information created by adding the friend evaluation information before update to the friend evaluation information after update, or only the friend evaluation information before update, may also be used as necessary. Using the friend evaluation information after update allows the intention of friends to be reflected in real time, thus providing the user of the navigation device 200 with useful information. As an example of change of the first posting information, the position information affirmatively evaluated by other persons other than the friends, the position information negatively evaluated by friends or other persons (typically, information negatively evaluated as "Dislike"), and the position information (the so-called check-in information) on places, stores, or facilities the friends or other persons passed or reached may be used. A "friend" mentioned here is a person on the network who is a friend of the user of the navigation device 200 but need not be a person who has actually met the user. "Other persons" mentioned here include another parson who has a particular relation with the user, such as a celebrity (famous person) or an entertainer who is unilaterally identified by the user of the navigation device 200 through a particular mass media (medium such as TV, radio, magazine), and who has not a particular relation with the user at all.

In step S103, the terminal ECU 210 determines whether the parking brake (PKB) 130 of the vehicle 100 is enabled (ON state) or disabled (OFF state). The terminal ECU 210 makes this determination typically based on the detection result of the operation signal of the parking brake 130. If it is determined that the parking brake 130 is disabled or that the parking brake 130 has been changed from the enabled state to the disabled state (Yes in step S103), typically, if the vehicle 100 is in the state immediately before being started (immediately before the start), the processing proceeds to step S104. Otherwise (No in step S103), the processing skips step S104 and proceeds to step S105. As an example of change, the determination in step S103 may be repeated if the result of step S103 is No. In another example of change, if it is determined in step S103 that the parking brake 130 is enabled, it is possible to proceed to step S104 typically on condition that the vehicle 100 is stationary.

In step S104, the terminal ECU 210 displays the first posting information, acquired in step S102, on the display unit 240. More specifically, the terminal ECU 210 superimposes an affirmative display "Like", which is an updated part of the friend evaluation information affirmatively evaluated by friends, on the map displayed on the display unit 240. The display unit 240 corresponds to the "display unit" of the present invention. This allows the user of the navigation device 200 to easily and visually recognize the information, acquired by the terminal ECU 210, on the display unit 240. In this case, it is preferable that the detailed information on the friend evaluation information be displayed on the map by specifying (typically tapping) this affirmative display on the screen of the display unit 240. This enables the user to reference the friend evaluation information, affirmatively evaluated by a friend, before traveling on the vehicle 100 without having to perform a special operation. In this case, it is preferable that the information on the fried (name, picture, etc.) be displayed on the map. In addition, when the same friend posts the same friend evaluation information multiple times or when each of the multiple friends posts the same friend evaluation information, the number of evaluations may also be displayed.

In step S105, the terminal ECU 210 logs in the management servers 610, 620, and 630 through the account authentication described above to selectively acquire, via the communication unit 230, the posting information on positions (also called "second posting information") corresponding to the surrounding positions (place, store, facility, sightseeing area, etc.) within a predetermined distance from the current position (current position measured by the GPS unit 220) of the vehicle 100 that is the host vehicle. In this case, without having to perform a special operation (special operation performed by the user of the navigation device 200 to log in the management servers 610, 620, and 630) to execute the function to cooperate with the network service, the user of the navigation device 200 can automatically (seamlessly) acquire the second posting information on the surrounding of the vehicle, which is considered useful, by performing a predetermined operation to execute a function other than a function to cooperate with the network service. This allows the user of the navigation device 200 to utilize the second posting information without worrying about the network service. Therefore, the intention of the network users using the network service can be reflected in real time.

In step S105, the second posting information acquired from the management servers 610, 620, and 630 typically includes the updated part of the position information (also called "surrounding evaluation information") on the places, stores, and facilities affirmatively evaluated by friends, who are registered in the network service in advance by the user of the navigation device 200, or by network users who are other persons other than the friends. The information created by adding the surrounding evaluation information before update to the surrounding evaluation information after update, or only the surrounding evaluation information before update, may also be used as necessary. Using the surrounding evaluation information after update allows the network user's intention about the surroundings of the current position to be reflected in real time, thus providing the user of the navigation device 200 with useful information supplied by the network users. As an example of change of the second posting information, the surrounding evaluation information negatively evaluated by friends or other persons (typically, information negatively evaluated as "Dislike") and the position information (the so-called check-in information) such as places, stores, or facilities the friends or other persons passed or reached may be used.

In step S106, the terminal ECU 210 displays the second posting information, acquired in step S105, on the display unit 240. More specifically, the terminal ECU 210 superimposes an affirmative display "Like", which is an updated part of the surrounding evaluation information affirmatively evaluated by friends or other persons, on the map displayed on the display unit 240. In this case, it is preferable that, when the information is affirmatively evaluated by other persons multiple times, the number of evaluations by other persons be additionally displayed around the affirmative display. On the other hand, when the surrounding evaluation information of a friend is displayed, it is preferable that the information (name, picture, etc.) on the friend be additionally displayed on the map. In addition, when the same friend posts the same surrounding evaluation information multiple times or when each of the multiple friends posts the same surrounding evaluation information, it is preferable that the number of evaluations be displayed with the information. In this case, it is preferable that the detailed information on the surrounding evaluation information be displayed on the map when the user specifies (typically taps on) this surrounding evaluation information on the screen of the display unit 240. This enables the user to reference the surrounding evaluation information, affirmatively evaluated by friends or other persons, before traveling on the vehicle 100 without having to perform a special operation. When the surrounding evaluation information of a friend is displayed, it is preferable that the information (name, picture, etc.) on the friend be additionally displayed on the map.

Figure 3:
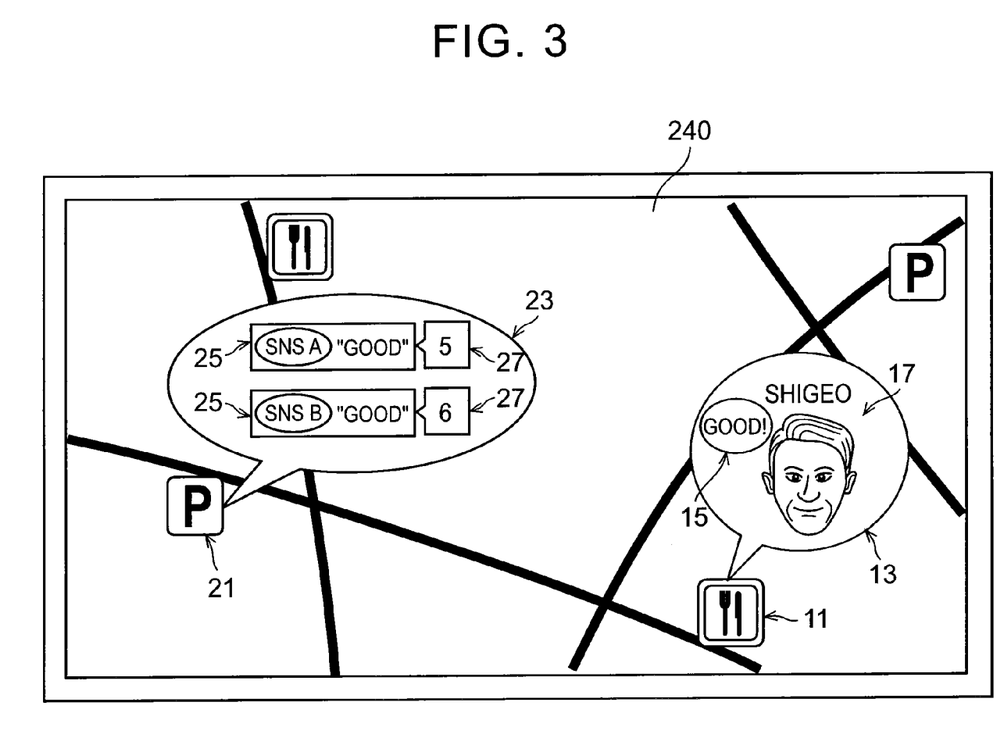
FIG. 3 is an example of a display displayed on a display unit 240 in step S106 in FIG. 2.

FIG. 3 shows an example of an actual display in step S106. In the example of display shown in FIG. 3, position information 11 and 21 on the surroundings of the vehicle is superimposed on the map screen of the display unit 240. The position information 11 is displayed as a mark indicating a restaurant affirmatively evaluated by the friend "SHIGEO" and, in addition, friend information 13 is displayed around the position information 11. The friend information 13 includes an evaluation mark 15 (in FIG. 3, mark "Good"), used for affirmative evaluation in a network service in which the friend is registered, and the friend's personal information (in FIG. 3, name "SHIGEO" and the picture of the friend's face) 17. On the other hand, the position information 21 is displayed as a mark indicating a parking lot affirmatively evaluated by other persons and, in addition, other-person information 23 is displayed around the position information 21. The other-person information 23 includes an evaluation mark 25 identifying a network service in which other persons are registered and number-of-evaluations information 27 indicating the number of times this parking lot is affirmatively evaluated by other persons. In the example of display in FIG. 3, the mark "SNS A" and the mark "SNS B", each of which identifies a network service, are displayed as the evaluation mark 25. The number-of-evaluations information 27 for the evaluation "good" in "SNS A" is "5", indicating that the number of evaluations affirmatively evaluated by other persons in this network service is five. Similarly, the number-of-evaluations information 27 for the evaluation "good" in "SNS B" is "6", indicating that the number of evaluations affirmatively evaluated by other persons in this network service is six.

Returning to FIG. 2, in step S107, the terminal ECU 210 determines whether the user of the navigation device 200 issues a search request for the destination. In this case, the search for the destination includes a search for surrounding facilities and a search by genre. If it is determined that a search request is issued (Yes in step S107), the processing proceeds to step S108. Otherwise (No in step S107), the position information providing processing is terminated without performing any processing. Typically, if destination candidates are output on the display unit 240 based on the input information for a search, the terminal ECU 210 determines that a search request is issued.

In step S108, the terminal ECU 210 logs in the management servers 610, 620, and 630 through the account authentication described above to selectively acquire, via the communication unit 230, posting information on positions (also called "third posting information) that is posting information on the destination candidates and is accumulated in the management servers 610, 620, and 630. More specifically, as the third posting information, the terminal ECU 210 acquires information affirmatively evaluated by network users (friends on the network or other persons) for the destination candidates extracted by the search (this information is also called "destination candidate evaluation information"). In this case, without having to perform a special operation (special operation performed by the user of the navigation device 200 to log in the management servers 610, 620, and 630) to execute the function to cooperate with the network service, the user of the navigation device 200 can automatically (seamlessly) acquire the third posting information, which is useful for the user of the navigation device 200, in synchronization with the destination search operation that is a predetermined operation to execute a function other than a function to cooperate with the network service. This allows the user of the navigation device 200 to utilize the third posting information without worrying about the network service. Therefore, the intention of the network users using the network service can be reflected in real time.

In step S109, the terminal ECU 210 adds the third posting information, acquired in step S108, to the destination candidate list displayed on the display unit 240 and, after that, terminates the position information providing processing. In this case, the user of the navigation device 200 can easily and visually recognize the destination candidate evaluation information, displayed with the destination candidates, on the display unit 240. This allows the user of the navigation device 200 to reference the third posting information (destination candidate evaluation information) corresponding to the destination candidates when selecting a destination from the destination candidates. If the navigation device 200 is a so-called "communication type" device, it is preferable that the information on the destination itself be acquired through communication with the information providing center 600 or with another information providing center. On the other hand, if the navigation device 200 is a so-called "standalone type" device, it is preferable that the information on the destination itself be extracted and acquired from the information stored in advance in the device.

Figure 4:
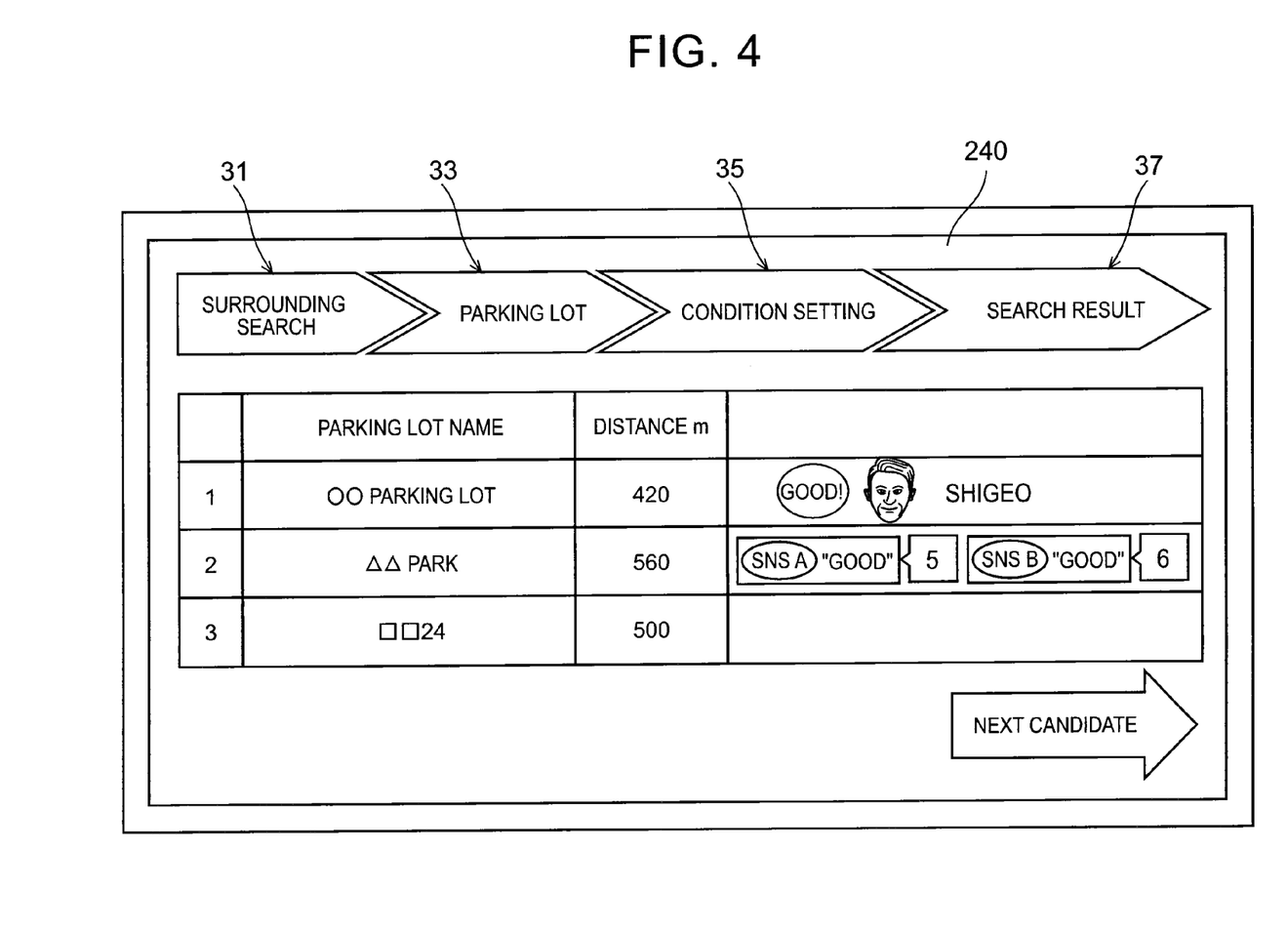
FIG. 4 is an example of a display displayed on the display unit 240 in step S109 in FIG. 2.

FIG. 4 shows an example of an actual display in step S109. In the example of display shown in FIG. 4, the search result is displayed on the display unit 240 with an item 37 displayed to indicate that the display content is a "search result". In this search result, it can be visually recognized that the final item 37 is obtained by expanding the items—an item 31 of "surrounding search", an item 33 of "parking lot", and an item 35 of "condition design"—sequentially in this order. On the display screen of the item 31, a surrounding search is performed for the destination. On the display screen of the item 33, the result of the surrounding search for the parking lots, selected as the destination, is displayed. On the display screen of the item 35, a condition is set for selecting the candidate from multiple parking lots searched for by the surrounding search. On the display screen of the item 37, the list is displayed that contains the names of the three destination candidates, that is, "○○ parking lot" that is the first candidate, "ΔΔ park" that is the second candidate, and "□□24" that is the third candidate, and the distances (in meters) from the vehicle to each of the candidates. If there are further destination candidates, the user taps on the key "Next Candidate" to expand the display screen on which the destination candidates are displayed.

In addition, the information on the network users accumulated in the management servers 610, 620, and 630, such as the third posting information described above, more specifically, the information on the friend information 13 and the other-person information 23 described above is displayed in this list as added information. In this case, "○○ parking lot" is set as the first candidate with the highest priority. This setting is based on the determination that the distance from the vehicle is shortest and that a friend affirmatively evaluates it. "ΔΔ park" is set as a candidate with the second highest priority. This setting is based on the determination that the distance from the vehicle is longest but that other persons affirmatively evaluate it (more specifically, the number of evaluations in the first network is five, and the number of evaluations in the second network is six). "□□24" is set as the third candidate with the lowest priority. This setting is based on the determination that the distance from the vehicle is the second shortest distance but that nobody affirmatively evaluates it.

In the example of display described above, it is preferable that a destination candidate, corresponding to destination candidate evaluation information affirmatively evaluated by friends, be displayed with priority higher than the priority of a destination candidate, corresponding to destination candidate evaluation information evaluated affirmatively by other persons and higher than the priority of a destination candidate that is not affirmatively evaluated by any one. In addition, it is preferable that a destination candidate, corresponding to destination candidate evaluation information evaluated affirmatively by other persons, be displayed with priority higher than the priority of a destination candidate that is not affirmatively evaluated by any one. This display mode allows the user of the navigation device 200 to select a destination from the destination candidates corresponding to evaluation information affirmatively evaluated by friends or other persons. In addition, the user of the navigation device 200 can easily identify a destination candidate corresponding to the information affirmatively evaluated by friends or other persons. Of course, with priority on the distance from the vehicle, it is possible to display "□□24" as a candidate with the second highest priority, and "ΔΔpark" as a candidate with the third highest priority. As another method, a higher-priority candidate may be displayed using a color or a font different from that of a lower-priority candidate. This helps the user of the navigation device 200 select a destination more smoothly.

As an additional example, it is possible to configure the screen so that, when the user of the navigation device 200 taps on the area of the friend information 13 or other-person information 23, displayed on the display unit 240, with a finger, the user is linked to the network service in which the information is registered. It is also possible to display the friend information 13 and the other-person information 23 described above on a screen other than the search result screen shown in FIG. 4, for example, on a screen on which information on each destination is displayed.

Figure 6:
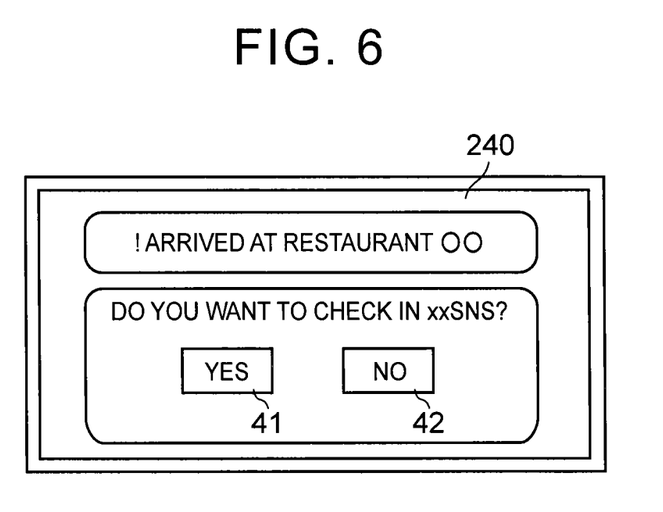
FIG. 6 is an example of a display displayed on a display unit 240 in step S202 in FIG. 5.
Figure 7:
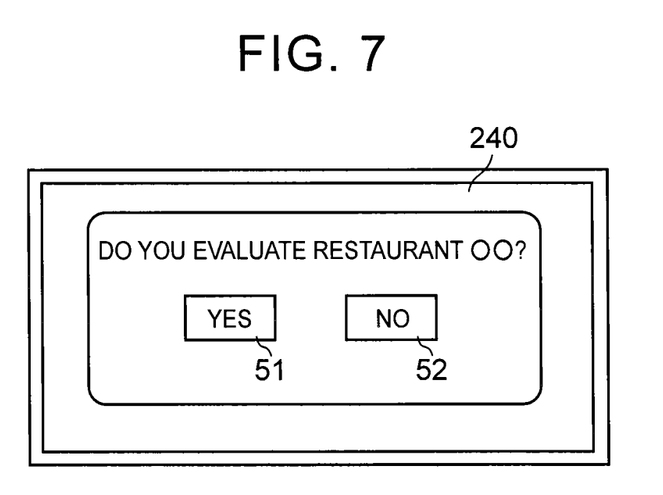
FIG. 7 is an example of a display displayed on the display unit 240 in step S206 in FIG. 2.

The position information providing processing in a second embodiment is described below with reference to FIG. 5 to FIG. 7.

Figure 5:
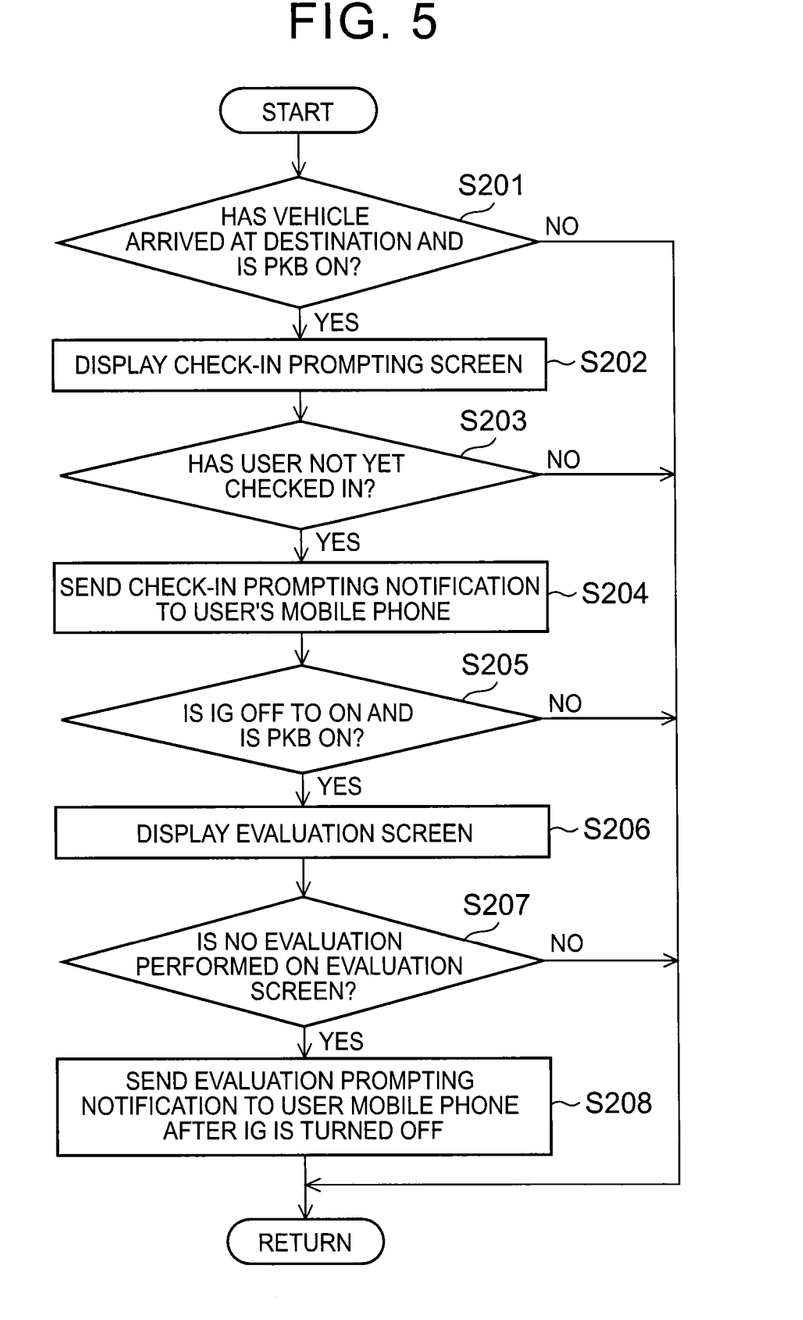
FIG. 5 is a diagram showing a flowchart of position information providing processing in a second embodiment.

According to the flowchart shown in FIG. 5, the terminal ECU 210 first determines in step S201 whether the vehicle 100 has arrived at the destination. If the vehicle 100 has arrived at the destination, the terminal ECU 210 further determines whether the parking brake 130 has enabled information (ON state). If the vehicle 100 has arrived at the destination and the parking brake 130 is enabled (Yes in step S201), the processing proceeds to step S202; otherwise (No in step S201), the terminal ECU 210 terminates the position information providing processing without performing any processing. In this case, whether the vehicle 100 has arrived at the destination may be determined based on the information indicating that the vehicle 100 has actually arrived at the destination or based on the information supposing that the vehicle 100 has arrived at the destination.

In step S202, the terminal ECU 210 causes the display unit 240 to display the check-in prompting screen that prompts the user to check in the network service that is registered in advance. FIG. 6 shows an example of an actual display in step 202. In the example of the display shown in FIG. 6, the display "Arrived at restaurant ∘∘" or "Arrived at destination" and the display "Do you want to check in xxSNS?", as well as a "Yes" selection key 41 and a "No" selection key 42, are displayed on the display unit 240. This display allows the user of the navigation device 200 to select and tap on the selection key 41 or the selection key 42 to indicate whether the user wants to check in the network service. Therefore, without having to perform a special operation (special operation performed by the user to log in the management servers 610, 620, and 630) to cooperate with the network service, it is possible to automatically (seamlessly) prompt the user of the navigation device 200 to use the check-in function by the above-described brake operation that is performed separately from the special operation. If the user of the navigation device 200 taps on the "Yes" selection key 41, it is preferable that the user check in directly to "xxSNS" or the user be connected to the check-in screen of "xxSNS". In this case, the terminal ECU 210 performs the function of posting means for posting the information on the destination of the vehicle 100 to the network service. In this case, the user may check in to one network service or check in to two or more network services at a time. In addition, by performing this check-in operation, the posted comments or pictures can be uploaded to the network service as necessary.

As an example of change, step S202 may be executed under the condition that, in step S201, the determination of the parking brake 130 is omitted and only the determination whether the vehicle 100 has arrived at the destination is performed (for example, whether the route guidance for the vehicle 100 is completed). In this case, the terminal ECU 210 may cause the display unit 240 to display the check-in screen in a visually-recognizable format but in an inoperable mode and then, on condition that an additional operable condition is satisfied, to display the check-in screen in an operable mode. In another example, the check-in screen may be displayed in an operable mode on condition that an operation that does not require operation permission (for example, voice recognition operation or manual operation on the switches on the steering wheel of the vehicle) has been performed.

In step S203, the terminal ECU 210 determines whether the user of the navigation device 200 has not yet checked in to the network service on the screen of the display unit 240. If it is determined that the user has not yet checked in (Yes in step S203), the processing proceeds to step S204; otherwise (No in step S203), the terminal ECU 210 terminates the position information providing processing without performing any processing.

In step S204, the terminal ECU 210 sends a check-in prompting notification to the mail of the mobile phone managed by the user of the navigation device 200. After that, the user performs the selection operation to select a link, included in the mail, to automatically check in to the network service or to move to the check-in screen of the network service. In this case, the terminal ECU 210 executes the function as "notification means" for sending a destination information prompting notification to the terminal apparatus. The check-in prompting notification may be sent, not only to the mail of the mobile phone, but also to the mail accumulated in the management servers 610, 620, and 630 or to the mail of the user's personal computer (PC). Therefore, without having to perform a special operation (special operation performed by the user to log in the management servers 610, 620, and 630) to cooperate with the network service, it is possible to automatically (seamlessly) prompt the user to use the check-in function by the above-described selection operation that is performed separately from the special operation. The notification in step S204 may be sent when step S203 is satisfied; in addition, the notification may be sent only when the user does not check in to the network service on the screen of the display unit 240 or may be sent with step S203 omitted.

In step S205, the terminal ECU 210 determines, after step S204, whether the ignition device 150 of the vehicle 100 is turned off at the destination and then turned on again. At the same time, if the ignition device 150 is turned on again, the terminal ECU 210 determines whether the parking brake 130 is enabled (on state) again. If the condition in step S205 is satisfied (Yes in step S205), the processing proceeds to step S206; otherwise (No in step S205), the terminal ECU 210 terminates the position information providing processing without performing any processing. The determination in step S205 determines whether the vehicle 100, which has arrived at the destination, is in the state immediately before being started.

In step S206, the terminal ECU 210 causes the display unit 240 to display the evaluation screen for evaluating the destination. FIG. 7 shows an example of an actual display in step S206. In the example of the display shown in FIG. 7, the display "Do you evaluate restaurant ∘∘?", as well as a "Yes" selection key 51 and a "No" selection key 52, is displayed on the display unit 240. Therefore, without having to perform a special operation (special operation performed by the user to log in the management servers 610, 620, and 630) to cooperate with the network service, it is possible to automatically (seamlessly) prompt the user of the navigation device 200 to perform the evaluation of a destination by the above-described ignition operation and the brake operation that are performed separately from the special operation. It is preferable that, when the user of the navigation device 200 taps on the "Yes" selection key 51, the screen of the navigation device 200 be moved to the screen for making the detailed evaluation of the destination or be connected to the screen for making the detained evaluation of the destination at "xxSNS".

In step S207, following the processing related to step S206, the terminal ECU 210 determines whether the evaluation is actually performed for the destination on the evaluation screen of the display unit 240. If it is determined that the evaluation is not performed (Yes in step S207), that is, if the user taps on the "No" selection key 52 on the display screen displayed on the display unit 240 in step S206, the processing proceeds to step S208; otherwise (No in step S207), that is, if the user taps on the "Yes" selection key 51 on the display screen displayed on the display unit 240 in step S206, the terminal ECU 210 terminates the position information providing processing without performing any processing.

In step S208, the terminal ECU 210 sends a destination evaluation prompting notification to the mail of the mobile phone contracted or used by the user of the navigation device 200. After that, the user of the navigation device 200 performs the selection operation to select a link included in the mail to automatically log in one or more network services for posting the evaluation content about the destination on the evaluation screen of the network service. Therefore, without having to perform a special operation (special operation performed by the user to log in the management servers 610, 620, and 630) to cooperate with the network service, it is possible to automatically (seamlessly) prompt the user of the navigation device 200 to perform the evaluation of a destination by the above-described selection device that is performed separately from the special operation. The destination evaluation prompting notification may be sent, not only to the mail of the mobile phone, but also to the mail in the management server of the network service or to the mail of the user's personal computer (PC).

As described above, the vehicle 100, which is equipped with the navigation device 200 having the configuration described above, and the position information providing system 10, which includes a plurality of vehicles 100 and the information providing center 600, make it possible to easily provide the user of the navigation device 200 with useful information posted by the network users.

The present invention is not limited to the typical embodiments described above but various applications or modifications are possible. For example, each of the following modes, in which the above-described mode is applied, may be implemented.

With respect to the position information providing processing in the first embodiment shown in FIG. 2, the first position information providing processing consisting only of steps from step S101 to S104, the second position information providing processing consisting of a combination only of step S101, step S105, and step S106, the third position information providing processing consisting only of steps from step S107 to S109, and the processing created as necessary by combining any two of the first to third position information providing processing may be used.

With respect to the position information providing processing in the second embodiment shown in FIG. 5, the fourth position information providing processing consisting of a combination only of step S201 and step S202, the fifth position information providing processing consisting only of steps from step S201 to step S204, and the sixth position information providing processing consisting only of steps from step S201 to S206 may be used.

In the embodiments described above, though the control means for performing the position information providing processing shown in FIG. 2 and the position information providing processing shown in FIG. 5 is implemented by the terminal ECU 210 that also performs the proper navigation function of the navigation device 200, the present invention may also be configured so that special control means, provided separately from the terminal ECU 210, performs the position information providing processing shown in FIG. 2 and the position information providing processing shown in FIG. 5.

In the present invention, as the trigger operation via which the terminal ECU 210 of the navigation device 200 logs in the management servers 610, 620, and 630, the start operation of the navigation device 200 and the brake operation or the ignition operation of the vehicle 100 are used as in the embodiments described above. In addition to these operations, various other trigger operations may also be used. More specifically, the following operations of the navigation device 200 may be used as the trigger operation: the operation to search for the optimum route (path) from the start point to the destination (surrounding search, address search, genre search), the operation to confirm the information on the route, the operation to additionally acquire map information when the map information on a new area is required, the operation to acquire traffic information, music information, mail information, along with other information, from a network service, and the operation to connect to a network service at fixed intervals. Similarly, the following operations of the vehicle 100 may be used as the trigger operation: the operation to turn on the accessory (ACC) power supply, the operation to start the on-vehicle communication module, the operation to establish communication with an external device by means of the communication module, the driving operation to travel at a predetermined distance after posting information on the positions is acquired from a network service, and the driving operation to travel at a predetermined time after posting information on the positions is acquired from a network service.

In the embodiments described above, the position information providing system 10 is described as a system that is configured in such a way that the terminal ECU 210 of the navigation device 200 works as the main component to perform the login processing with the management servers 610, 620, and 630 and the acquisition processing to acquire posting information from the network service. As an example of change of this position information providing system 10, it is also possible in the present invention to configure the information providing system in such a way that a part of the control performed by the terminal ECU 210 is divided among the management servers 610, 620, and 630.

In one example of the position information providing system in the example of change described above, the control unit provided in each of the management servers 610, 620, and 630 can perform the login processing with the terminal ECU 210 of the navigation device 200 and, at the same time the login processing is performed, send the whole or a part of the posting information accumulated on the network service to the navigation device 200 via the line network 400.

In addition, in the information providing system in one example of change described above, while the terminal ECU 210 of the navigation device 200 performs the login processing with the management servers 610, 620, and 630, the management servers can send, at this login processing time, the whole or a part of posting information accumulated on the network service to the navigation device 200 via the line network 400.

Although the navigation device 200 has been described as an example of the position information providing device in the embodiments described above, a device that provides the map information service on the Internet (device having the map search function) may also be used in the present invention as the position information providing device. In a specific example in this case, posting information on positions posted to a predetermined network service (for example, evaluation information evaluated by network users) may be acquired by logging in the management server of the corresponding network service, and the acquired posting information may be displayed on the map provided from the map information service.

The present invention may take the following aspects based on the description of the embodiments and various examples of change given above.

The present invention may take the following aspect (aspect 1).

"A position information providing method for providing information on positions to a user, the position information providing method including: logging in a management server via a line network in synchronization with a predetermined operation performed by the user to acquire a whole or a part of posting information on positions, the management server managing a network service, the predetermined operation executing a function other than a function to cooperate with the network service to which information can be posted, the posting information on positions being posted to the network service by a network user and accumulated in the management server."

The present invention may take the following aspect (aspect 2).

"The position information providing method according to aspect 1, further including:

when logging in the management server, selectively acquiring surrounding evaluation information from the posting information accumulated in the management server, the surrounding evaluation information being evaluated by the network user for a surrounding position within a predetermined distance from a current position of the user."

The present invention may take the following aspect (aspect 3).

"The position information providing method according to aspect 1 or 2, wherein when logging in the management server, if the posting information includes evaluation information evaluated by another person having a particular relation with the user on the network, the user selectively acquires the evaluation information, as well as information on the another person, from the posting information accumulated in the management server."

The present invention may take the following aspect (aspect 4).

"The position information providing method according to any one of aspects 1 to 3, wherein when logging in the management server, if the posting information includes evaluation information evaluated a plurality number of times by another person who is not a friend of the user on the network, the user selectively acquires the evaluation information from the posting information accumulated in the management server."

The present invention may take the following aspect (aspect 5).

"The position information providing method according to any one of aspects 1 to 4, further including:

causing a display unit to display the acquired information with map information."

The present invention may take the following aspect (aspect 6).

"The position information providing method according to any one of aspects 1 to 5, wherein the predetermined operation is an operation for starting a navigation device mounted in a vehicle in which the user rides."

The present invention may take the following aspect (aspect 7).

"The position information providing method according to aspect 1, wherein the user logs in the management server via the line network in synchronization with an operation performed by the user to search for a destination, which is the predetermined operation, and selectively acquires destination candidate evaluation information from the posting information accumulated in the management server, the destination candidate evaluation information being evaluated by the network user for destination candidates extracted by the search."

The present invention may take the following aspect (aspect 8).

"The position information providing method according to aspect 7, further including:

causing a display unit to display the acquired destination candidate evaluation information as well as the destination candidates corresponding to the information."

The present invention may take the following aspect (aspect 9).

"The position information providing method according to aspect 8, wherein the display unit displays a destination candidate, corresponding to the destination candidate evaluation information that is friend evaluation information evaluated by a friend of the user on the network, in a display mode with a priority higher than a priority of a destination candidate corresponding to the destination candidate evaluation information that is not the friend evaluation information."

The present invention may take the following aspect (aspect 10).

"A position information providing method for providing information on positions to a user, the position information providing method including causing a display unit to display a screen in synchronization with a predetermined operation performed by the user, the screen prompting to post a destination of the user to a network service, the predetermined operation executing a function other than a function to cooperate with the network service to which information can be posted."

The present invention may take the following aspect (aspect 11).

"A position information providing method for providing information on positions to a user, the position information providing method including:

sending a notification to a terminal apparatus managed by the user in synchronization with a predetermined operation performed by the user, the notification prompting to post a destination of the user to a network service, the predetermined operation executing a function other than a function to cooperate with the network service to which information can be posted."

The present invention may take the following aspect (aspect 12).

"The position information providing method according to aspect 10 or 11, wherein the predetermined operation is an operation for enabling parking braking of a vehicle in which the user rides."

The present invention may take the following aspect (aspect 13).

"A position information providing method for providing information on positions to a user, the position information providing method including:

causing a display unit to display an evaluation screen in synchronization with an operation performed by the user, the evaluation screen being provided for evaluating a destination of the user, the operation being performed to set a starting device of a vehicle, in which the user rides, from an off state to an on state and, at the same time, to set a parking brake of the vehicle from a disabled state to an enabled state."

The present invention may take the following aspect (aspect 14).

"The position information providing method according to aspect 13 wherein if evaluation is not performed for the destination, a notification is sent to a terminal apparatus managed by the user, the notification prompting to evaluate the destination."

The present invention may take the following aspect (aspect 15).

"A position information providing system for providing information on positions to a user, the position information providing system including:

a management server that can manage a network service, to which information can be posted, and at the same time, communicate with a navigation device via a line network, the navigation device being provided for performing route guidance of a vehicle; and a control unit provided in the management server, wherein when logging in the management server via the line network in synchronization with a predetermined operation performed by the user, the control unit sends a whole or a part of posting information to the navigation device via the line network, the predetermined operation executing a function other than a function to cooperate with the network service, the posting information being posted to the network service by a network user and accumulated in the management server."

The present invention may take the following aspect (aspect 16).

"A position information providing system for providing information on positions to a user, the position information providing system including:

a navigation device for performing route guidance of a vehicle; and a management server that can manage a network service, to which information can be posted, and at the same time, communicate with the navigation device via a line network wherein the navigation device logs in the management server via the line network in synchronization with a predetermined operation performed by the user, the predetermined operation executing a function other than a function to cooperate with the network service, and when logging in the navigation device, the management server sends a whole or a part of posting information to the navigation device via the line network, the posting information being posted to the network service by a network user and accumulated in the management server."

The invention claimed is:

1. A position information providing device that provides information on positions to a user, the position information providing device comprising:
   a control unit configured to log in a management server via a line network to post a destination of the user to a network service, the management server managing the network service, wherein
   the control unit sends a notification to a terminal apparatus managed by the user in synchronization with an enabling of a parking braking of a vehicle in which the user rides, the notification prompting to post the destination to the network service.

2. A position information providing system comprising:
   the position information providing device according to claim 1;
   the management server that manages one or more social networking services (SNS) each working as the network service; and
   the line network that connects the position information providing device and the management server.

3. A position information providing device that provides information on positions to a user, the position information providing device comprising:
   a control unit configured to log in a management server via a line network to post a destination of the user to a network service, the management server managing the network service; and
   a display unit configured to display a destination evaluation screen in synchronization with a setting of a starting device of a vehicle, in which the user rides, from an off state to an on state and, at the same time as a setting of a parking brake of the vehicle from a disabled state to an enabled state.

4. The position information providing device according to claim 3, wherein
   if an evaluation is not performed for the destination, the control unit sends a notification to a terminal apparatus managed by the user, the notification prompting to evaluate the destination.

5. A position information providing system comprising:
   the position information providing device according to claim 3;
   the management server that manages one or more social networking services (SNS) each working as the network service; and
   the line network that connects the position information providing device and the management server.

* * * * *